US010740526B2

(12) United States Patent
Fredenburg et al.

(10) Patent No.: US 10,740,526 B2
(45) Date of Patent: Aug. 11, 2020

(54) INTEGRATED CIRCUIT DESIGN SYSTEM WITH AUTOMATIC TIMING MARGIN REDUCTION

(71) Applicant: Movellus Circuits Incorporated, Ann Arbor, MI (US)

(72) Inventors: Jeffrey Fredenburg, Ann Arbor, MI (US); Muhammad Faisal, Ann Arbor, MI (US); David M. Moore, Ann Arbor, MI (US); Ramin Shirani, Morgan Hill, CA (US); Yu Huang, Ann Arbor, MI (US)

(73) Assignee: Movellus Circuits, Inc., Ann Arbor, MI (US)

( * ) Notice: Subject to any disclaimer, the term of this patent is extended or adjusted under 35 U.S.C. 154(b) by 138 days.

(21) Appl. No.: 15/674,879

(22) Filed: Aug. 11, 2017

(65) Prior Publication Data

US 2019/0050517 A1 Feb. 14, 2019

(51) Int. Cl.
| | | |
|---|---|---|
| *G06F 9/455* | (2018.01) | |
| *G06F 17/50* | (2006.01) | |
| *G06F 30/392* | (2020.01) | |
| *G06F 30/3312* | (2020.01) | |
| *G06F 119/12* | (2020.01) | |
| *G06F 119/18* | (2020.01) | |

(52) U.S. Cl.
CPC ........ *G06F 30/392* (2020.01); *G06F 30/3312* (2020.01); *G06F 2119/12* (2020.01); *G06F 2119/18* (2020.01)

(58) Field of Classification Search
USPC .................................. 716/106, 108, 111, 113
See application file for complete search history.

(56) References Cited

U.S. PATENT DOCUMENTS

| | | | |
|---|---|---|---|
| 5,999,060 A | 12/1999 | Zuta | |
| 6,218,876 B1 | 4/2001 | Sung | |
| 6,275,553 B1 | 8/2001 | Esaki | |
| 6,424,192 B1 | 7/2002 | Lee | |
| 6,496,965 B1 | 12/2002 | van Ginneken | |
| 6,744,324 B1 | 6/2004 | Adams | |
| 6,826,247 B1 | 11/2004 | Elliott | |
| 7,216,249 B2 | 5/2007 | Fujiwara | |
| 8,117,576 B2 | 2/2012 | Mossawir | |
| 8,205,182 B1* | 6/2012 | Zlatanovici ........... | G06F 17/505 703/16 |
| 8,321,489 B2 | 11/2012 | Staszewski | |
| 8,427,205 B1 | 4/2013 | Nagaraj | |
| 8,791,734 B1 | 7/2014 | Hara | |

(Continued)

*Primary Examiner* — Brian Ngo
(74) *Attorney, Agent, or Firm* — Lance Kreisman; Peninsula Patent Group

(57) ABSTRACT

A computer-implemented method for manufacturing an integrated circuit chip is disclosed. The method includes selecting cell-based circuit representations to define an initial circuit design. The initial circuit design is partitioned into multiple sub-design blocks to define a partitioned design. Circuit representations of local clock sources are inserted into the partitioned design. Each local clock source is for clocking a respective sub-design block and based on a global clock source. A timing analysis is performed to estimate skew between each local clock source and the global clock source. The partitioned design is automatically modified based on the estimated skew.

18 Claims, 5 Drawing Sheets

(56) References Cited

U.S. PATENT DOCUMENTS

| | | |
|---|---|---|
| 2005/0189972 A1 | 9/2005 | Foo |
| 2005/0251775 A1* | 11/2005 | Wood .................. G06F 17/5036 716/124 |
| 2008/0180450 A1* | 7/2008 | Dowling ............... G06F 9/3842 345/503 |
| 2009/0108900 A1* | 4/2009 | Sotiriou .............. G06F 17/5059 327/261 |
| 2009/0210840 A1* | 8/2009 | Berry .................. G06F 17/5031 716/113 |
| 2013/0120036 A1 | 5/2013 | Zhu |
| 2013/0300477 A1 | 11/2013 | Ueda |
| 2016/0036454 A1 | 2/2016 | Moehlmann |
| 2016/0188777 A1* | 6/2016 | Bisht ................... G06F 17/5077 716/131 |
| 2016/0204787 A1 | 7/2016 | Lotfy |
| 2017/0193136 A1 | 7/2017 | Prasad |
| 2018/0286103 A1* | 10/2018 | Woop ................... G06T 15/005 |

* cited by examiner $\Delta t_{TDC, cont., S1}$ = Value measured by controller TDC $\Delta t_{TDC, S1}$ = Value measured by subdesign 1 TDC

INTEGRATED CIRCUIT DESIGN SYSTEM WITH AUTOMATIC TIMING MARGIN REDUCTION

TECHNICAL FIELD

The disclosure herein relates to electronic design automation (EDA) tools. More particularly, the disclosed embodiments relate to methods, systems, and user interfaces for implementing analog circuit blocks in a digital design flow.

BACKGROUND

Electronic design automation (EDA) tools are often used to generate a detailed design of a semiconductor circuit. Computer-implemented tools such as computer-aided design (CAD) tools are often used to carry out the design flow. Many of the operations may be implemented as software running on computer servers and/or workstations.

A typical digital design flow may involve generating a system specification that provides design parameters for the semiconductor circuit to one or more of the EDA tools. A circuit implementing the system specification may then be generated manually or automatically (such as by using ready-made IP functions). The circuit may be entered by a hardware description language (such as Verilog, VHDL, or any other hardware description language (HDL)), or by other means. In a logic synthesis operation, an abstract form of desired circuit behavior (typically a register transfer level (RTL) description or behavioral description) is turned into a design implementation in terms of logic gates. In a verification operation, the netlist output by the logic synthesis operation is verified for functionality against the circuit design specification. A physical implementation of the netlist may then be performed, including an analysis to verify functionality, timing and performance across predetermined or user-specified ranges of process, voltage, and temperature parameters.

Digital blocks implemented in an integrated circuit generally employ multiple remote clock sources that are based on a global clock source. The remote clock sources may, due to propagation delays, process, voltage, temperature and/or other factors, exhibit timing skew with respect to the global clock source. Timing skew between clock sources in an integrated circuit design may result in nonoptimal power and area results for the chip.

Conventionally, IC design flows provide for a worst-case skew analysis that involves manual adjustments of clock phases. The overall process is complicated, costly, and inefficient. Accordingly, what is needed are methods, systems and associated apparatus that allow for the manufacture of integrated circuits in a less complicated, cheaper, and more efficient manner.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Embodiments of a computer-implemented method for manufacturing an integrated circuit chip are disclosed. In one embodiment, a computer-implemented method for manufacturing an integrated circuit chip is disclosed. The method includes selecting cell-based circuit representations to define an initial circuit design. The initial circuit design is partitioned into multiple sub-design blocks to define a partitioned design. Circuit representations of local clock sources are inserted into the partitioned design. Each local clock source is for clocking a respective sub-design block and based on a global clock source. A timing analysis is performed to estimate skew between each local clock source and the global clock source. The partitioned design is automatically modified based on the estimated skew.

Figure 1:
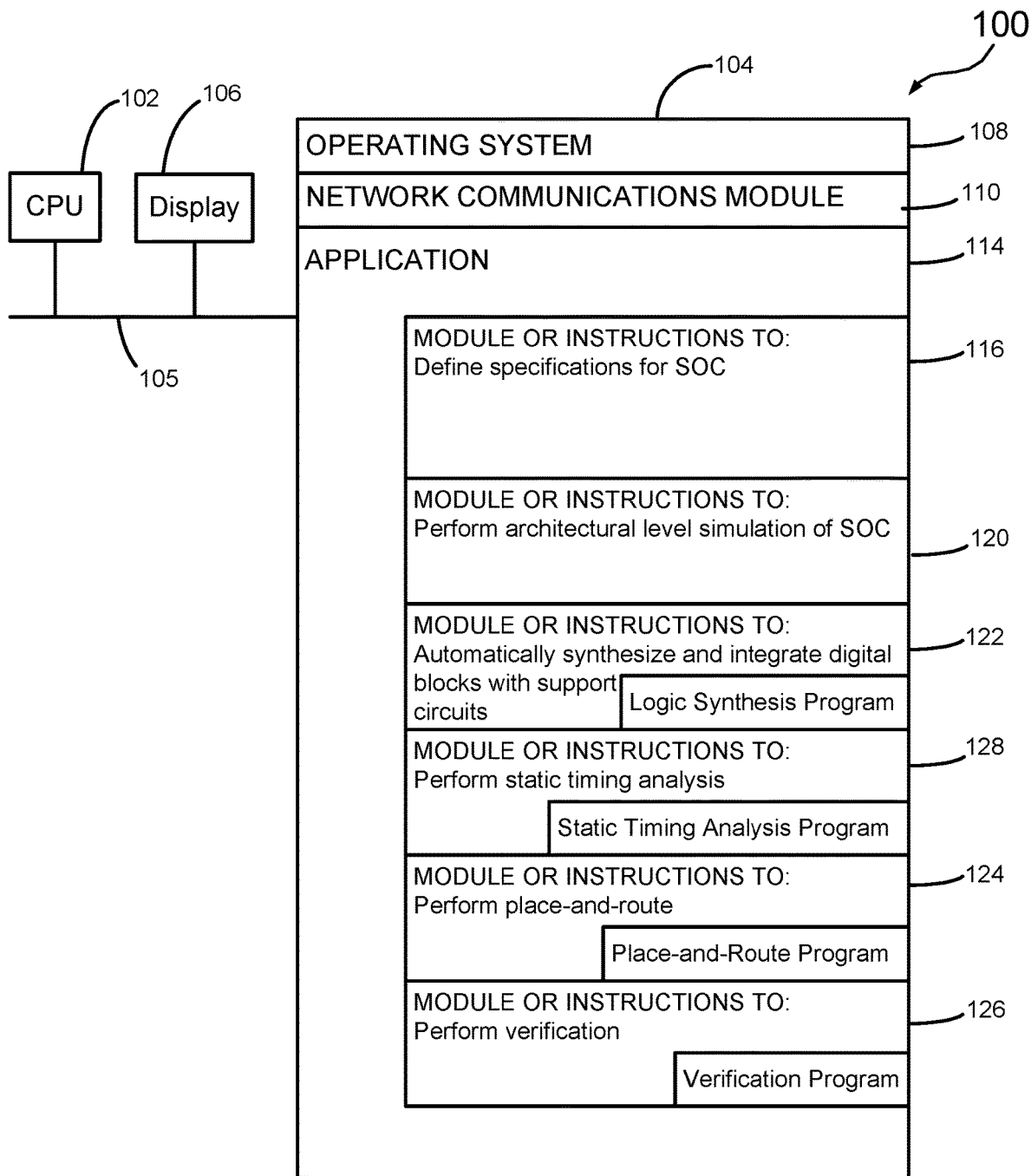
FIG. 1 illustrates one embodiment of an electronic design automation (EDA) system.

FIG. 1 illustrates one embodiment of an electronic design automation system (e.g., a server, a workstation, or other computer system), generally designated 100, that may be used to generate the detailed design of a digital system embodied as a semiconductor circuit. The system 100 may include one or more processors or CPUs 102 for executing modules, programs and/or instructions stored in a memory 104. The system 100 may also include a display 106 that may be local or remote from the system. One or more communication busses 105 couples the processors to the memory. For some embodiments, the memory 104 may include high-speed main memory in the form of DRAM and may also include bulk memory in the form of one or more magnetic or optical disk-storage devices or solid state storage devices, or network access to cloud storage located remotely from the processors.

With continued reference to FIG. 1, the memory 104, or alternatively memory device(s) within the memory 104, comprises a computer-readable storage medium. In some embodiments, the memory 104 stores a variety of programs, modules and data structures, or a subset or superset thereof. An operating system 108 includes procedures for handling various basic system services and for performing hardware-dependent tasks. A network communications module (or instructions) 110 may be used for connecting the system 100 to other computers via a communication interface (not shown) and one or more communications networks, such as the Internet, other wide area networks, metropolitan area networks, and local area networks. An application or program 114 controls the operation and function of the system.

For some embodiments, and further referring to FIG. 1, the application or program 114 may include one or more programs, modules, or a subset or superset thereof. For example, a specifications module may be included that defines specifications for a system-on-chip (SOC) integrated circuit chip, at 116. The applications may also include a simulation module, at 120, to perform an architectural level simulation of the SOC. Respective logic synthesis, place-and-route, and verification modules 122, 124 and 126, are also provided to carry out logic synthesis, place-and-route, and verification operations. To provide for highly accurate timing analysis between global and local clock source circuit representations, a static timing analysis module 128 is provided. As more fully described below, the static timing analysis module provides for reduced timing margins throughout the circuit design flow by identifying and automatically removing timing skew between global clock sources and distributed local clock sources.

Figure 2:
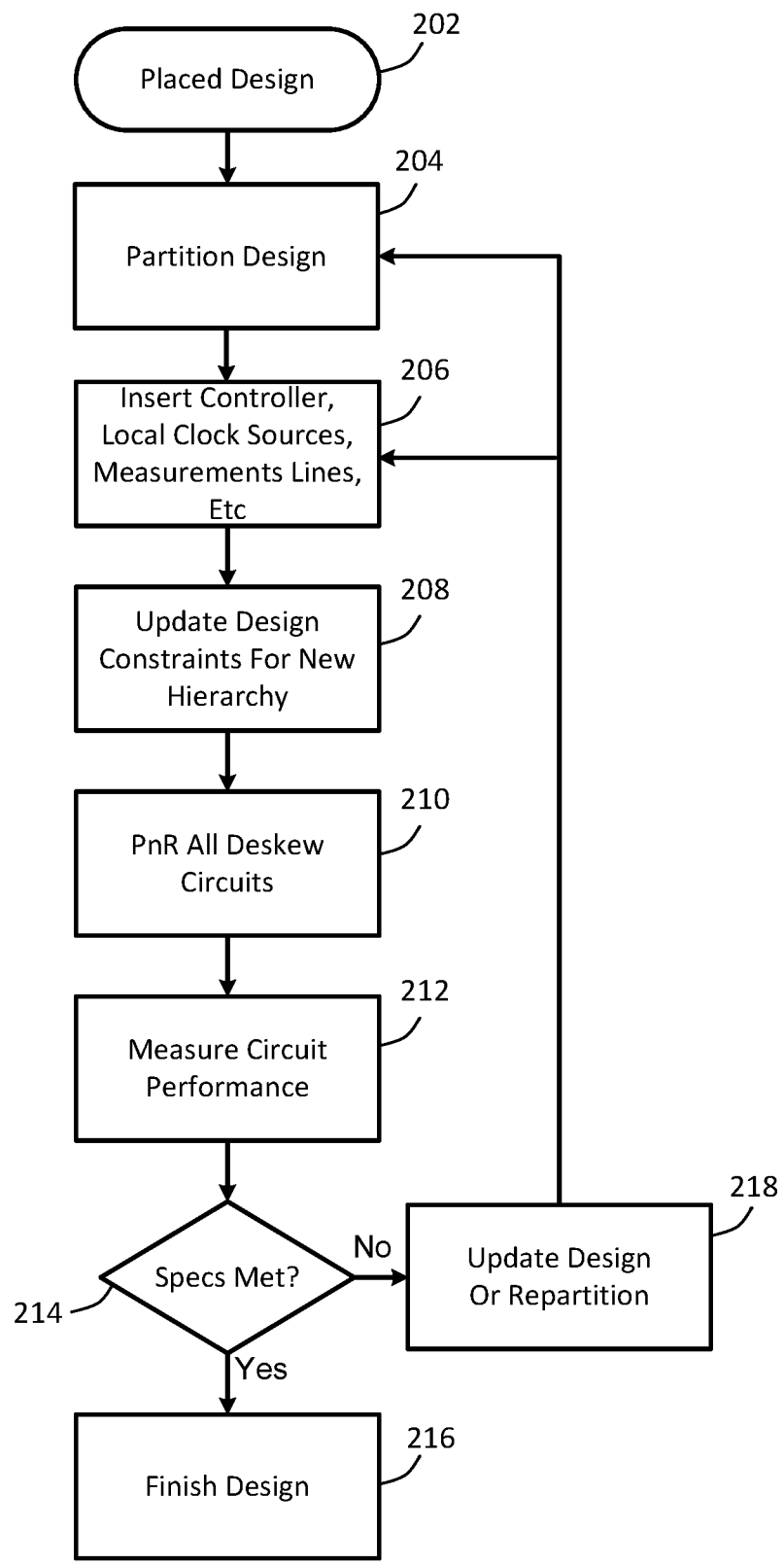
FIG. 2 illustrates steps for one embodiment of a computer-implemented method of operation involving the EDA system of FIG. 1.

FIG. 2 illustrates a flow chart of steps for one embodiment of a method for designing a system-on-chip (SOC) using the automated skew identification and removal timing analysis module. The method begins with an initial placed design, at 202. The initial placed design may be based on specifications that include various requirements and functionality of the overall SOC.

Further referring to FIG. 2, the initial placed design is partitioned, at 204. The partitioning may involve grouping large portions of the design together, such as through proximity or functionality. For some embodiments, each partitioned sub-design may include, for example, at least 100,000 gates. In some embodiments, the partitioned sub-designs may represent different integrated circuit die for stacking into a three-dimensional circuit package.

With continued reference to FIG. 2, after partitioning the initial placed design into multiple sub-designs, the method provides a designer with an interface to insert local clock sources corresponding to the partitioned sub-designs, and a skew controller to reduce actual skew post-fabrication, between each of the local clock sources and a global clock source, at 206. Generally, the local clock sources may include support circuits as described in copending U.S. patent application Ser. No. 15/390,360, titled: "Concurrently Optimized System-On-Chip Implementation With Automatic Synthesis And Integration", filed Dec. 23, 2016, assigned to the Assignee of the instant application, and expressly incorporated herein by reference. Depending on the application, each local clock source may be realized as circuit representation of a delay-locked loop (DLL), phase-locked loop (PLL), or synchronized multiplying delay-locked loop (MDLL).

Following insertion of the local clock sources and the skew control circuitry, design constraints for the partitioned design are updated, at 208, followed by place and routing of the circuitry, at 210. Estimations of circuit performance are then made, at 212, via the timing analysis module. For some embodiments, the timing analysis module performs static timing analysis similar to that disclosed in copending U.S. patent application Ser. No. 15/297,979 titled: "Timing Analysis For Electronic Design Automation Of Parallel Multi-State Driver Circuits", filed Oct. 19, 2016, assigned to the Assignee of the instant application, and incorporated by reference herein.

Further referring to FIG. 2, the estimates made by the timing analysis module may then be compared to circuit specifications, at 214. If the specifications are met, then the design is complete, at 216. If the specifications are not satisfied, then remedial action may be carried out in the form of an update to the design, or a repartitioning of the initial placed design, at 218. Following remedial action, the various steps described above may be repeated. The entire process may be iteratively carried out several times until a design meeting the specification is accomplished.

Figure 3:
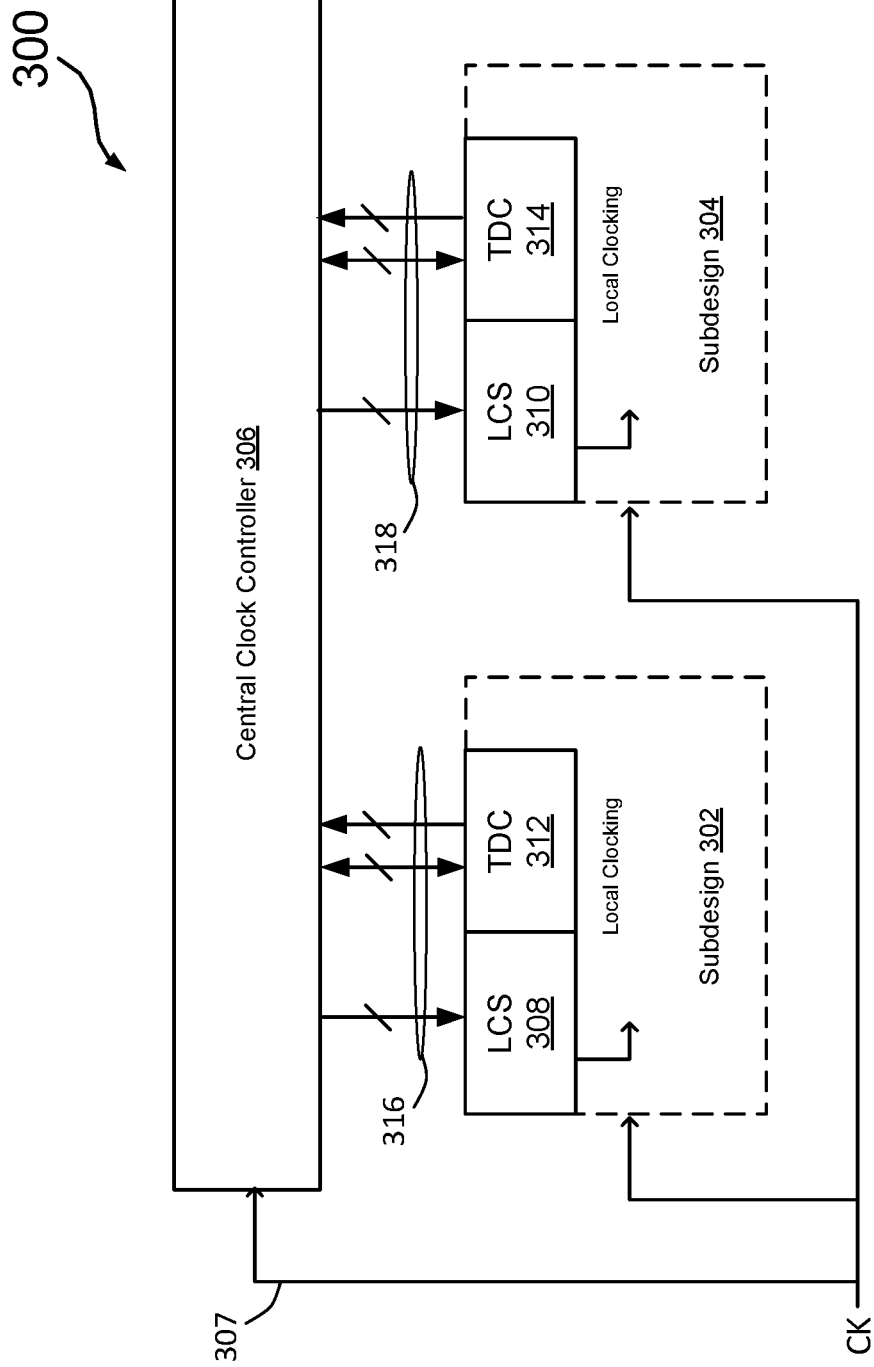
FIG. 3 illustrates one embodiment of a clock skew removal circuit.

FIG. 3 illustrates a circuit representation of one embodiment of a clock skew removal circuit, generally designated 300. The clock skew removal circuit corresponds to the inserting of circuit representations described above with respect to FIG. 2, which supports partitioned sub-designs 302 and 304 resulting from the partitioning step described above. The circuit 300 employs a clock skew controller 306 that receives a global clock signal CK at a clock input 307. Respective interfaces 316 and 318 couple the central clock controller to each of the sub-designs 302 and 304.

Further referring to FIG. 3, the sub-designs 302 and 304 include respective adjustable local clock sources 308 and 310. As noted above, the local clock sources may be realized as delay-locked loops, phase locked-loops, and/or multiplying delay-locked loops (MDLL). Although not shown, each local clock is adjustable via a control input that may vary a delay, or provide a phase adjustment to an output signal from the clock source. Respective skew measurement circuits 312 and 314 are provided to measure local skew between the local clock source and a global clock source provided via the interface. For one embodiment, the skew measurement circuits take the form of time-to-digital converters (TDC) or phase detectors.

Figure 4:
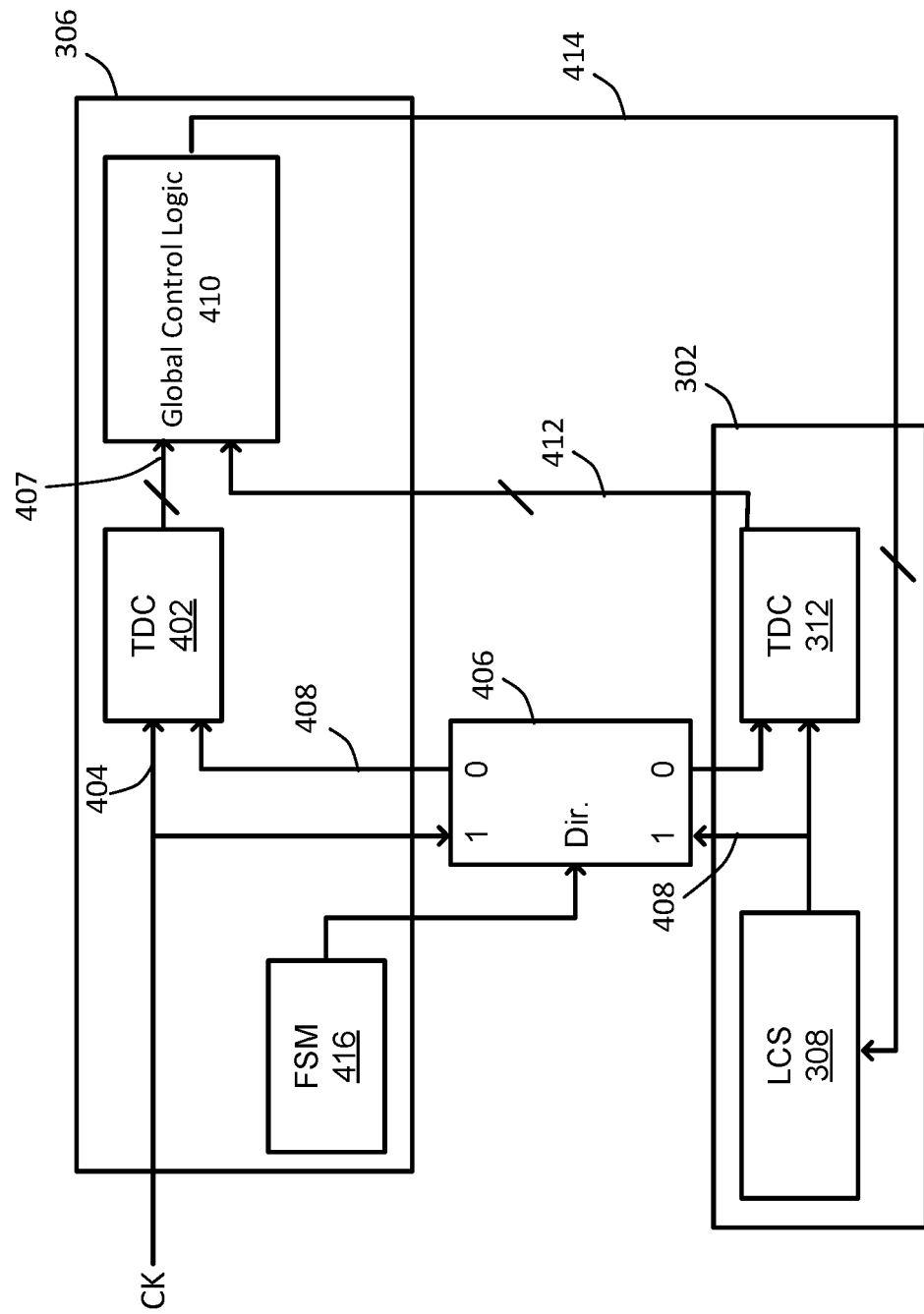
FIG. 4 illustrates further detail of one embodiment of the clock skew removal circuit of FIG. 3.

Further detail regarding a portion of the clock skew controller 306 and a single sub-design, such as 302, is shown in FIG. 4. The controller includes a global time-to-digital converter (TDC) 402 that receives the global clock signal CK via a global clock input 404, and a local clock signal provided via interface 406. The interface 406 directs the local clock signal from the local clock source 308 that supports the first sub-design 302. The interface path used to supply the local clock source, at 408 (shown with a path component in the sub-design, and a path component on the controller), may contribute to a propagation delay affecting the phase of the local clock signal as it is received at the global TDC 402. The output word of the global TDC is then fed via a first input 407 to global control logic 410.

With continued reference to FIG. 4, the local clock signal is also fed as a first input to the local TDC 312. A second input of the local TDC receives the global clock signal CK via a similar (or the same, if bidirectional) path used by the interface 406 to route the local clock signal, such that the propagation delays experienced by the local clock signal and the global clock signal are equivalent. The local TDC output is fed to the global control logic 410 via path 412.

The global control logic 410 compares the respective output words from the global and local TDCs 402 and 312 and generates an error signal for routing to the local clock source 308 along feedback path 414. The local clock source 308 may then adjust a delay or output phase of the local clock signal to eliminate relative skew (with respect to the global clock signal).

For one embodiment, and referring again to FIG. 4, the controller interface 406 is responsive to state signals generated by a finite state machine 416. One form of the state signals, labeled DIR, controls the directional flow of the local clock signals from each sub-design and the global clock signal. The DIR signals thus act as interleaved traffic control signals to alternate access between each local clock source and the controller. This minimizes the number of paths utilized by the skew controller. Additional detail regarding the timing of various state signals is described below with respect to FIG. 5.

Figure 5A:
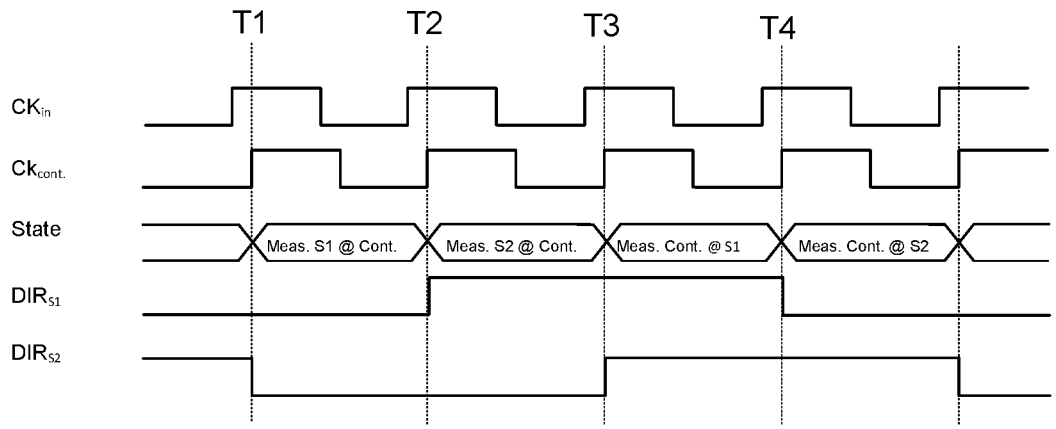
FIGS. 5A-5C illustrate graphs of the timing behavior for various portions of the clock skew removal circuit of FIGS. 3 and 4.

FIG. 5A illustrates a timing chart showing state signals that control how the skew controller of FIGS. 3 and 4 interacts with multiple sub-designs to route the local clock and global clock signals between circuits. While two sub-designs are shown and described below, hundreds of sub-designs may share the same controller and operate according to the basic concepts described below. The global clock signal being received by the skew controller (as a reference) is represented by waveform $CK_{in}$, while the global clock signal that is actually measured is represented by $CK_{cont}$. At time T1, the finite state machine generates a first state signal that represents a command to measure the skew between the local clock signal of the first sub-design 302 and the global clock signal. The interface 406 receives a routing signal $DIR_{S1}$ that causes the interface 406 to allow for passage of the local clock signal from the first sub-design to the controller. At T2, the state signal switches to represent a command to measure the skew between the local clock signal of the second sub-design and the global clock signal. The routing signal $DIR_{S1}$ goes low, while a second routing signal $DIR_{S2}$ goes high, causing the interface 406 to connect to the second sub-design (such as 304 of FIG. 3) to receive the local clock signal from the second sub-design. At T3, the state signal changes to represent a command to measure the skew between the local clock signal of the first sub-design 302 and the global clock signal, but at the first sub-design TDC. The interface 406 receives routing signal $DIR_{S1}$ which remains high, while routing signal $DIR_{S2}$ also goes high. The result is that the global clock signal passes to the first sub-design TDC 312, while the local clock signal of the second sub-design 304 passes to the controller 306. Thus, while the controller skew is being measured at the first sub-design 302, the controller 306 is measuring the skew of the second sub-design 304 at the controller. At T4, the state changes again with a state signal that represents a command to measure the skew between the local clock signal of the second sub-design 304 and the global clock signal, but at the second sub-design TDC. Concurrently, the local clock signal from another local clock source is fed to the controller 306.

Figure 5B:
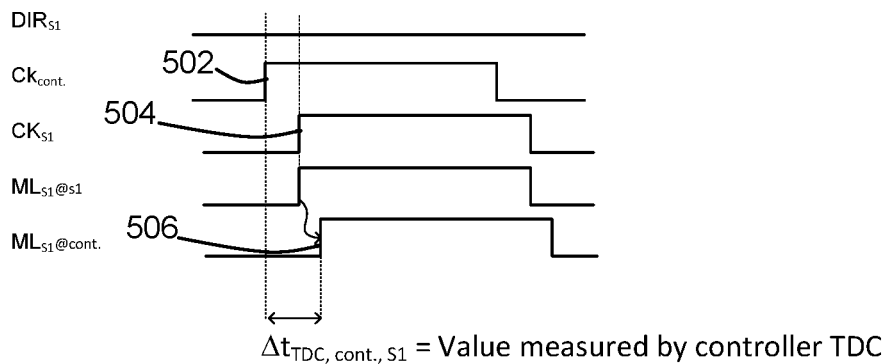
Figure 5C:
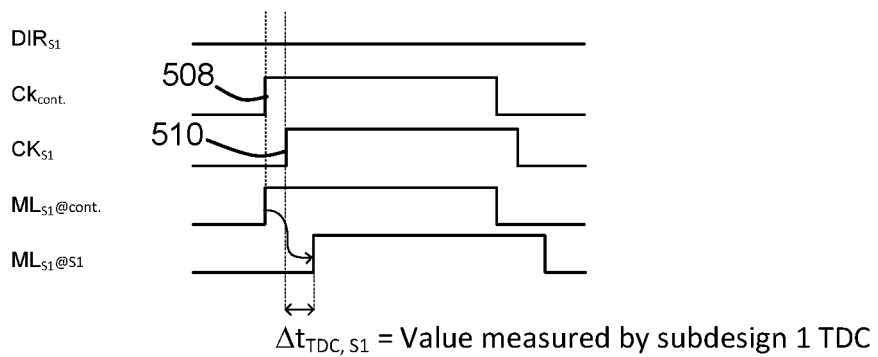

FIG. 5B illustrates skew detected at the controller TDC 402 between a rising edge of the global clock signal $CK_{cont}$, at 502, and the rising edge of the local clock signal $CK_{S1}$, at 504, while also including a skew component arising from the propagation delay caused by the routing or measurement path of the interface, at 506. The additional skew component is cancelled out by an equal component (between rising edge of CKS1 and signal $ML_{S1@S1}$, identified as $\Delta t_{TDC,S1}$, shown in FIG. 5C, which illustrates skew detected at the local clock source TDC between a rising edge of the global clock signal $CK_{cont}$, at 508, and the rising edge of the local clock signal $CK_{S1}$, at 510.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time pro-gramming operation (e.g., blowing fuses within a configu-ration circuit during device production), and/or connecting one or more selected pins or other contact structures of the device to reference voltage lines (also referred to as strap-ping) to establish a particular device configuration or opera-tion aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A computer-implemented method for manufacturing an integrated circuit chip comprising:

selecting cell-based circuit representations to define an initial circuit design;

partitioning the initial circuit design into multiple sub-design blocks to define a partitioned design;

inserting circuit representations of local clock sources, each local clock source comprising a frequency gen-erator to locally create a local clock signal within a respective sub-design block, the local clock signal for clocking the respective sub-design block and based on a global clock signal created by a global clock source, each local clock source comprising a local skew mea-surement circuit to measure local skew between the global clock signal and the local clock signal;

performing a timing analysis to estimate skew between each local clock signal and the global clock signal, the estimated skew based on the measured local skew; and automatically modifying the partitioned design to reduce the estimated skew.

2. The computer-implemented method according to claim 1, wherein each local clock source includes a circuit repre-sentation of a delay circuit, and wherein automatically modifying the partitioned design comprises:

configuring each delay circuit to reduce the local skew between the associated local clock signal and the global clock signal.

3. The computer-implemented method according to claim 1, wherein automatically modifying the partitioned design comprises:
repartitioning the partitioned design to define an adjusted partitioned design.

4. The computer-implemented method according to claim 1, wherein at least one sub-design block comprises a circuit representation of a processor core.

5. The computer-implemented method according to claim 1, wherein at least two of the sub-design blocks comprise respective first and second integrated circuit (IC) chips for stacking as a three-dimensional IC.

6. The computer-implemented method according to claim 1, further comprising:
inserting a global skew controller to, when realized as a physical circuit on an integrated circuit (IC) chip, to (1) measure skew, proximate the global skew controller, between each local clock signal and the global clock signal, and (2) generate respective control signals to adjust respective phases of each local clock signal to reduce the measured skew.

7. The computer-implemented method according to claim 6, wherein:
each of the respective control signals varies a delay setting for each local clock signal to adjust each of the respective phases.

8. A non-transitory computer-readable storage medium, the medium storing instructions that when executed by a computer system will cause the computer system to:
in response to a command from a client to commence operations for a digital design flow for a digital system, selecting cell-based circuit representations to define an initial circuit design;
partitioning the initial circuit design into multiple sub-design blocks to define a partitioned design;
inserting circuit representations of local clock sources, each local clock source comprising a frequency generator to locally create a local clock signal within a respective sub-design block, the local clock signal for clocking the respective sub-design block and based on a global clock signal created by a global clock source, each local clock source comprising a local skew measurement circuit to measure local skew between the global clock signal and the local clock signal;
performing a timing analysis to estimate skew between each local clock signal and the global clock signal, the estimated skew based on the measured local skew; and
automatically modifying the partitioned design to reduce the estimated skew.

9. The non-transitory computer-readable storage medium of claim 8, wherein each local clock source includes a circuit representation of a delay circuit, and wherein the instructions that when executed by a computer system will cause the computer system to automatically modify the partitioned design will cause the computer system to:
configure each delay circuit to reduce the local skew between the associated local clock signal and the global clock signal.

10. The non-transitory computer-readable storage medium of claim 8, wherein the instructions that when executed by a computer system will cause the computer system to automatically modify the partitioned design will cause the computer system to:
repartition the partitioned design to define an adjusted partitioned design.

11. The non-transitory computer-readable storage medium of claim 8, wherein at least one sub-design block comprises a circuit representation of a processor core.

12. The non-transitory computer-readable storage medium of claim 8, wherein at least two of the sub-design blocks comprise respective first and second integrated circuit (IC) chips for stacking as a three-dimensional IC.

13. A computer-implemented method comprising:
performing a digital design flow involved in manufacturing an integrated circuit by selecting cell-based circuit representations to define an initial circuit design;
partitioning the initial circuit design into multiple sub-design blocks to define a partitioned design;
inserting circuit representations of local clock sources, each local clock source comprising a frequency generator to locally create a local clock signal within a respective sub-design block, the local clock signal for clocking the respective sub-design block and based on a global clock signal created by a global clock source, each local clock source comprising a local skew measurement circuit to measure local skew between the global clock signal and the local clock signal;
performing a timing analysis to estimate skew between each local clock signal and the global clock signal, the estimated skew based on the measured local skew; and
automatically modifying the partitioned design to reduce the estimated skew.

14. The computer-implemented method according to claim 13, wherein each local clock source includes a circuit representation of a delay circuit, and wherein automatically modifying the partitioned design comprises:
configuring each delay circuit to reduce the local skew between the associated local clock signal and the global clock signal.

15. The computer-implemented method according to claim 13, wherein automatically modifying the partitioned design comprises:
repartitioning the partitioned design to define an adjusted partitioned design.

16. The computer-implemented method according to claim 13, wherein at least one sub-design block comprises a circuit representation of a processor core.

17. The computer-implemented method according to claim 13, wherein at least two of the sub-design blocks comprise respective first and second integrated circuit (IC) chips for stacking as a three-dimensional IC.

18. The computer-implemented method according to claim 13, further comprising:
inserting a global skew controller to, when realized as a physical circuit on an integrated circuit (IC) chip, to (1) measure skew, proximate the global skew controller, between each local clock signal and the global clock signal, and (2) generate respective control signals to adjust respective phases of each local clock signal to reduce the measured skew.

* * * * *